United States Patent
Tran

(10) Patent No.: US 11,681,427 B1
(45) Date of Patent: *Jun. 20, 2023

(54) SYSTEM AND METHOD FOR DYNAMICALLY GROUPING AND DISPLAYING A PLURALITY OF CONTENT

(71) Applicant: PEER INC, Bellevue, WA (US)

(72) Inventor: Thinh Tran, Bellevue, WA (US)

(73) Assignee: PEER INC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,774

(22) Filed: Nov. 11, 2022

Related U.S. Application Data

(60) Provisional application No. 63/284,495, filed on Nov. 30, 2021.

(51) Int. Cl.
*G06F 3/0481* (2022.01)
*G06F 3/0485* (2022.01)
*G06F 3/04817* (2022.01)
*G06F 3/04883* (2022.01)

(52) U.S. Cl.
CPC ........ *G06F 3/0485* (2013.01); *G06F 3/04817* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 9,185,147 | B1 | 11/2015 | Keel |
| 10,747,414 | B2 | 8/2020 | Tran |
| 2006/0236251 | A1* | 10/2006 | Kataoka ............... G06F 3/0485 715/838 |
| 2013/0181975 | A1 | 7/2013 | Golden et al. |
| 2014/0129985 | A1 | 5/2014 | Morozov et al. |
| 2018/0096524 | A1* | 4/2018 | Ekambaram ........... G06T 17/20 |

* cited by examiner

*Primary Examiner* — Tuan S Nguyen
(74) *Attorney, Agent, or Firm* — Seed Intellectual Property Law Group LLP

(57) ABSTRACT

An orthogonal or multi-dimensional fabric user interface is described herein. A computer device executes an operating system that stores content in a multi-dimensional fabric. Users can access and view content that is stored in the multi-dimensional fabric at a specific location and time. The users request the specific location and time. The computer device r accesses the multi-dimensional fabric to anchor content within the multi-dimensional fabric user interface based on the specific location and time.

21 Claims, 12 Drawing Sheets

SYSTEM AND METHOD FOR DYNAMICALLY GROUPING AND DISPLAYING A PLURALITY OF CONTENT

TECHNICAL FIELD

The present application pertains to virtual environments, and more particularly, to virtual environments that dynamically group and display a plurality of content.

BACKGROUND

Description of the Related Art

Operating systems have changed little over the past few decades. Early operating systems were command driven, where a user specified a particular file location to access data. These operating systems morphed into the icon-based interfaces used today. Icon-based operating systems display graphical representations, or icons, of files or data. Icons are associated with a particular file location, such that interaction with an icon by a user results in the corresponding file location being accessed. Accordingly, historical operating systems have been structured around using the file's location within the memory to access data, which limits the flexibility of using alternative storage structures.

Additionally, there is a continuing desire to virtually visit actual physical locations that exist in the real world for a variety of purposes. This may be as basic as using a mapping software application. However, traditional mapping software is very limited in the information that it conveys and the user experience that it provides. Furthermore, it is desirable to be able to sift through large quantities of data in an efficient manner in such virtual environments. There is currently a continuing need to digest large quantities of data in such environments. The present disclosure addresses this and other needs.

BRIEF SUMMARY

Briefly stated, embodiments of the present disclosure are directed towards systems using a multi-dimensional fabric that store content to be viewed. The multi-dimensional fabric stores content using time and location coordinates, which can be accessed in accordance with a location and time associated with the multi-dimensional fabric user interface. In this way, user devices can display content to a user.

In some embodiments, the system for dynamically grouping and displaying a plurality of content includes a personal mobile computing device and a remote server. The personal mobile computing device stores authentication information. The personal mobile computing device includes a device memory that stores device computer instructions and a device processor that when executing the device computer instructions causes the personal mobile computing device to: determine when the personal mobile computing device is within range of a display device; coordinate authentication between the personal mobile computing device and a remote server; display a multi-dimensional fabric user interface to the user of the personal mobile computing device, wherein the multi-dimensional fabric user interface represents an actual physical location and is displayed to the user of the personal mobile computing device based on valid authentication of the personal mobile computing device with the user; and receive input from the user including a virtual location, date, and time at which the user requests to visit a virtual representation of the actual physical location.

The computer device includes a server memory that stores computer instructions and a processor that when executing the computer instructions causes the computer device to: select and provide the multi-dimensional fabric user interface specific for the user based on the valid authentication of the personal mobile computing device, and the virtual location, date, and time at which the user requests to visit; enable a user to view the plurality of content cards; group the plurality of content cards viewed by the user into decks based on a first characteristic of content in the content card; enable scrolling navigation by the user through the decks of content cards, wherein the content cards are in an expanded form, wherein each deck is displayable on a display device, and wherein the decks of content cards are stacked in a collapsed form after they have been scrolled through, manipulated, or otherwise viewed, by the user; in response to a first input initiating a first selected deck in the decks of content cards to be displayed in the collapsed form, display the first selected deck of content cards in the collapsed form on the display device, wherein the first selected deck of content cards is expandable in response to an additional user input; and in response to a second input initiating a second selected deck in the decks of content cards to be displayed in the stack form, display the second selected deck of content cards in the stack form on the display device, wherein the second selected deck of content cards is expandable in response to an additional user input.

In some embodiments of the system for dynamically grouping and displaying a plurality of content, the server processor executes further server computer instructions that further cause the remote server to: sub-group the plurality of decks of content cards based on additional characteristic of the contents in the decks of content cards. In another aspect of some embodiments, the content cards are organized based on a second characteristic of the contents along a first axis of a grid. In still another aspect of some embodiments, the content cards are organized based on a third characteristic of the contents along a second axis of a grid. In yet another aspect of some embodiments, the server processor executes further server computer instructions that further cause the remote server to: in response to new content cards being added to the plurality of content cards, display the new content cards as a standalone content cards in relation to the plurality of content cards; and in response to a third input instructing the new content cards to be added to a target deck of content cards, add the new content cards to the target deck of content cards.

In other embodiments of the system for dynamically grouping and displaying a plurality of content, the manipulation of the multi-dimensional fabric user interface based on the received input from the user includes anchoring digital content to the multi-dimensional fabric user interface. In another aspect of some embodiments, the manipulation of the multi-dimensional fabric user interface based on the received input from the user includes anchoring digital content to a user in the multi-dimensional fabric user interface. In still another aspect of some embodiments, the server processor executes further server computer instructions that further cause the remote server to: when a deck of content cards is displayed in the expanded form, enable a user to scroll through content cards in the deck. In yet another aspect of some embodiments, the server processor executes further server computer instructions that further cause the remote server to, when the plurality of decks of content cards are all displayed in the stacked form, enable a user to scroll through the plurality of decks of content cards.

In some embodiments, the remote server system for dynamically grouping and displaying a plurality of content, includes a server processor and a server memory that stores server computer instructions, the server processor when executing the server computer instructions causing the remote server to: select and provide the multi-dimensional fabric user interface specific for the user based on the valid authentication of the personal mobile computing device, and the virtual location, date, and time at which the user requests to visit; enable a user to view the plurality of content cards; group the plurality of content cards viewed by the user into decks based on a first characteristic of content in the content card; enable scrolling navigation by the user through the decks of content cards, wherein the content cards are in an expanded form, wherein each deck is displayable on a display device, and wherein the decks of content cards are stacked in a collapsed form after they have been scrolled through, manipulated, or otherwise viewed, by the user; in response to a first input initiating a first selected deck in the decks of content cards to be displayed in the collapsed form, display the first selected deck of content cards in the collapsed form on the display device, wherein the first selected deck of content cards is expandable in response to an additional user input; and in response to a second input initiating a second selected deck in the decks of content cards to be displayed in the stack form, display the second selected deck of content cards in the stack form on the display device, wherein the second selected deck of content cards is expandable in response to an additional user input.

In some embodiments of the system for dynamically grouping and displaying a plurality of content, the server processor executes further server computer instructions that further cause the remote server to: sub-group the plurality of decks of content cards based on additional characteristic of the contents in the decks of content cards. In another aspect of some embodiments, the content cards are organized based on a second characteristic of the contents along a first axis of a grid. In still another aspect of some embodiments, the content cards are organized based on a third characteristic of the contents along a second axis of a grid. In yet another aspect of some embodiments, the server processor executes further server computer instructions that further cause the remote server to: in response to new content cards being added to the plurality of content cards, display the new content cards as a standalone content cards in relation to the plurality of decks of content cards; and in response to a third input instructing the new content cards to be added to a target deck of content cards, add the new content cards to the target deck of content cards.

In other embodiments of the remote server system for dynamically grouping and displaying a plurality of content, the manipulation of the multi-dimensional fabric user interface based on the received input from the user includes anchoring digital content to the multi-dimensional fabric user interface. In another aspect of some embodiments, the manipulation of the multi-dimensional fabric user interface based on the received input from the user includes anchoring digital content to a user in the multi-dimensional fabric user interface. In still another aspect of some embodiments, the server processor executes further server computer instructions that further cause the remote server to, when a deck of content cards is displayed in the expanded form, enable a user to scroll through content cards in the deck. In yet another aspect of some embodiments, the server processor executes further server computer instructions that further cause the remote server to, when the plurality of decks of content cards are all displayed in the stacked form, enable a user to scroll through the plurality of decks of content cards.

In some embodiments of a method for dynamically grouping and displaying a plurality of content, the method includes: selecting and providing the multi-dimensional fabric user interface specific for the user based on the valid authentication of the personal mobile computing device, and the virtual location, date, and time at which the user requests to visit; enabling a user to view the plurality of content cards; grouping the plurality of content cards viewed by the user into decks based on a first characteristic of content in the content card; enabling scrolling navigation by the user through the decks of content cards, wherein the content cards are in an expanded form, wherein each deck is displayable on a display device, and wherein the decks of content cards are stacked in a collapsed form after they have been scrolled through, manipulated, or otherwise viewed, by the user; in response to a first input initiating a first selected deck in the decks of content cards to be displayed in the collapsed form, displaying the first selected deck of content cards in the collapsed form on the display device, wherein the first selected deck of content cards is expandable in response to an additional user input; and in response to a second input initiating a second selected deck in the decks of content cards to be displayed in the stack form, displaying the second selected deck of content cards in the stack form on the display device, wherein the second selected deck of content cards is expandable in response to an additional user input.

The embodiments described in the present disclosure improve upon known data storage architectures, structures, processes, and techniques in a variety of different computerized technologies, such as operating systems, user interfaces, and social networks.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
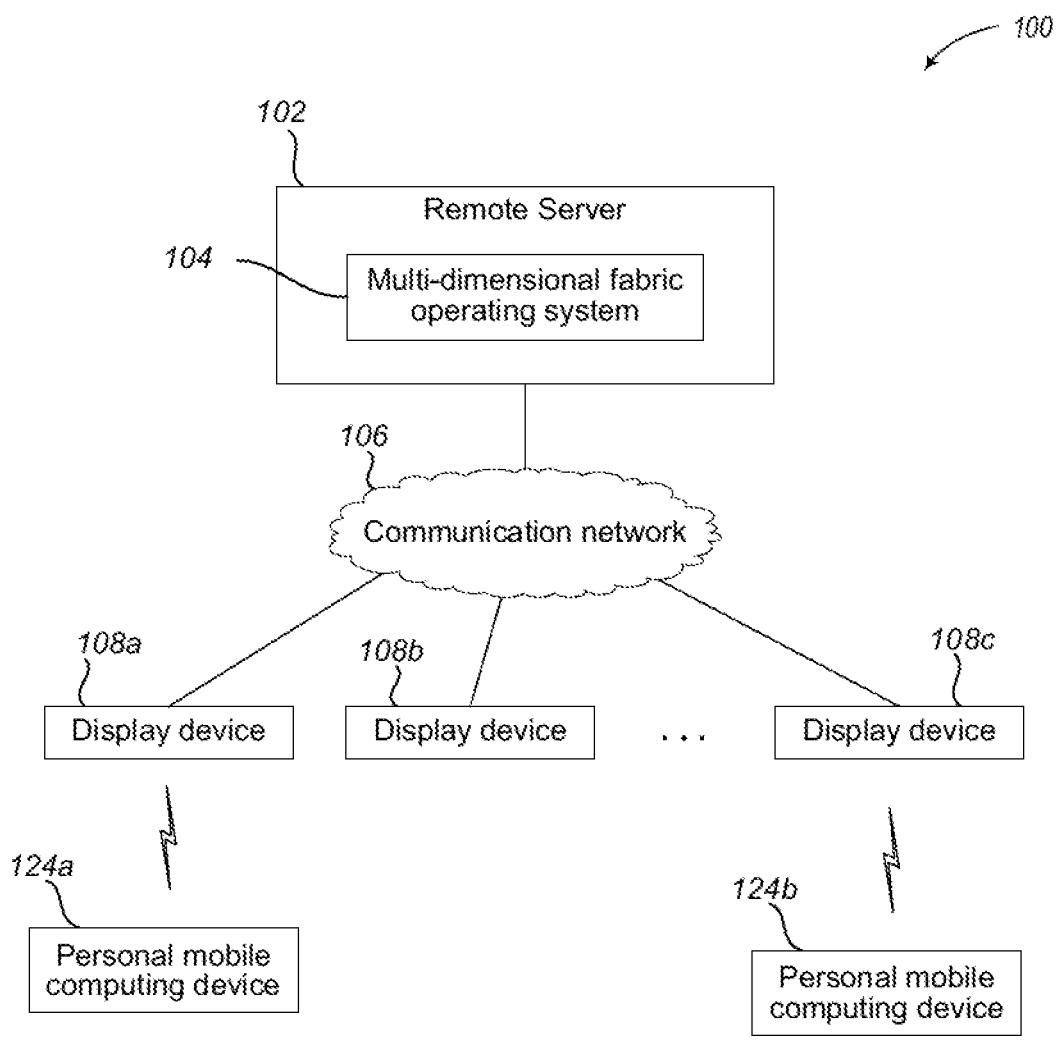
FIG. 1 illustrates a context diagram of an environment that provides a multi-dimensional fabric user interface for storing content in accordance with embodiments described herein.

FIG. 1 illustrates a context diagram of a system for dynamically grouping and displaying a plurality of content 100 that provides a multi-dimensional fabric user interface for storing content in accordance with embodiments described herein. In the illustrated example, system for dynamically grouping and displaying a plurality of content 100 includes a remote server 102, one or more display devices 108a-108c, and one or more personal mobile computing devices.

The remote server 102 in the system is configured as a remote computing system, e.g., cloud computing resources, which implements or executes a multi-dimensional fabric operating system 104. In various embodiments, a separate instance of the multi-dimensional fabric operating system 104 is maintained and executing for each separate personal mobile computing device 124a, 124b. In some embodiments, the multi-dimensional fabric user interface may be implemented as an operating shell.

Although not illustrated, the remote server 102 may also be running various programs that are accessible to the users of the personal mobile computing devices 124a, 124b via the multi-dimensional fabric operating system 104. Accordingly, the environment and system described herein make it possible for a plurality of applications to be run in the cloud, and a user accesses a particular application by moving the fabric to that application's coordinates.

The multi-dimensional fabric operating system 104 stores content according to a plurality of different dimensions. In some embodiments, the content is stored based on when the content was captured by the user or when it was stored by the remote server 102 (e.g., a time stamp added to a picture when the picture was captured or a time stamp when the picture was uploaded to the remote server), where the content was captured by the user (e.g., the location of the camera that captured the picture or a location of a display device used to upload the picture from the camera to the remote server), and what the content is about (e.g., food, clothing, entertainment, transportation, and the like).

A user in the system can access the multi-dimensional fabric operating system 104 via a display device 108a. The user has a personal mobile computing device 124, which can create or obtain content. The user can walk up to or approach a display device 108. The display device 108 coordinates authentication of the personal mobile computing device 124 with the remote server 102. The user can then use the display device 108 as a personal computer to upload content from the personal mobile computing device 124 to the remote server 102 using the multi-dimensional fabric operating system 104. Similarly, the user can use the display device 108 to access content previously stored by the multi-dimensional fabric operating system 104. For example, the user can use hand gestures, or touch interfaces, to provide input that manipulates a user interface displayed on the display device 108, where the user interface is generated by the multi-dimensional fabric operating system 104. The remote server 102 can respond to the input by providing an updated user interface of the multi-dimensional fabric to the display device 108 for display to the user. Notably, the user may transmit between the personal mobile computing device 124b and the remote server 102 via a communication network 106, without connecting to a display device 108 in some embodiments.

Figure 2:
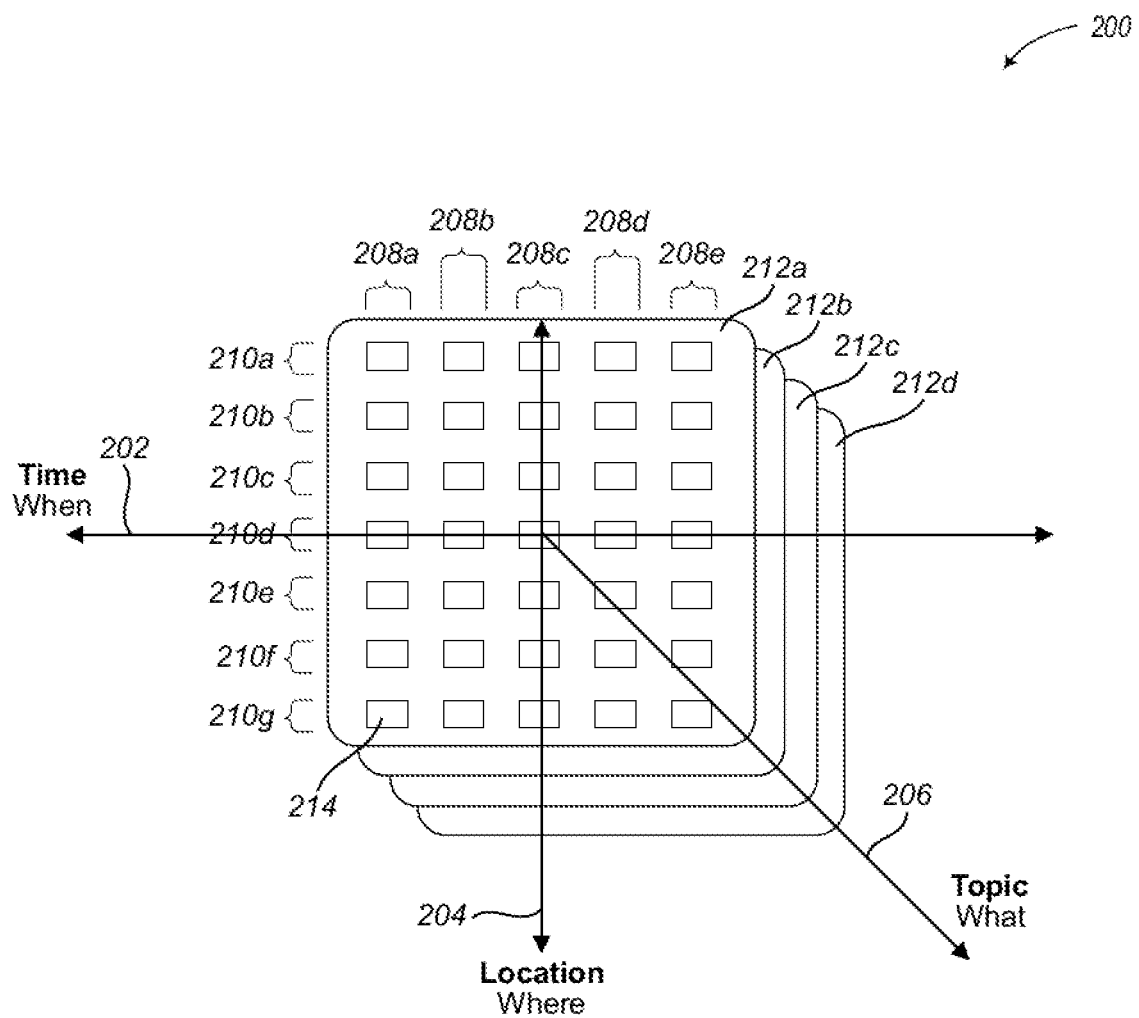
FIG. 2 illustrates a graphical representation of a multi-dimensional fabric user interface for storing content in accordance with embodiments described herein.
Figure 3:
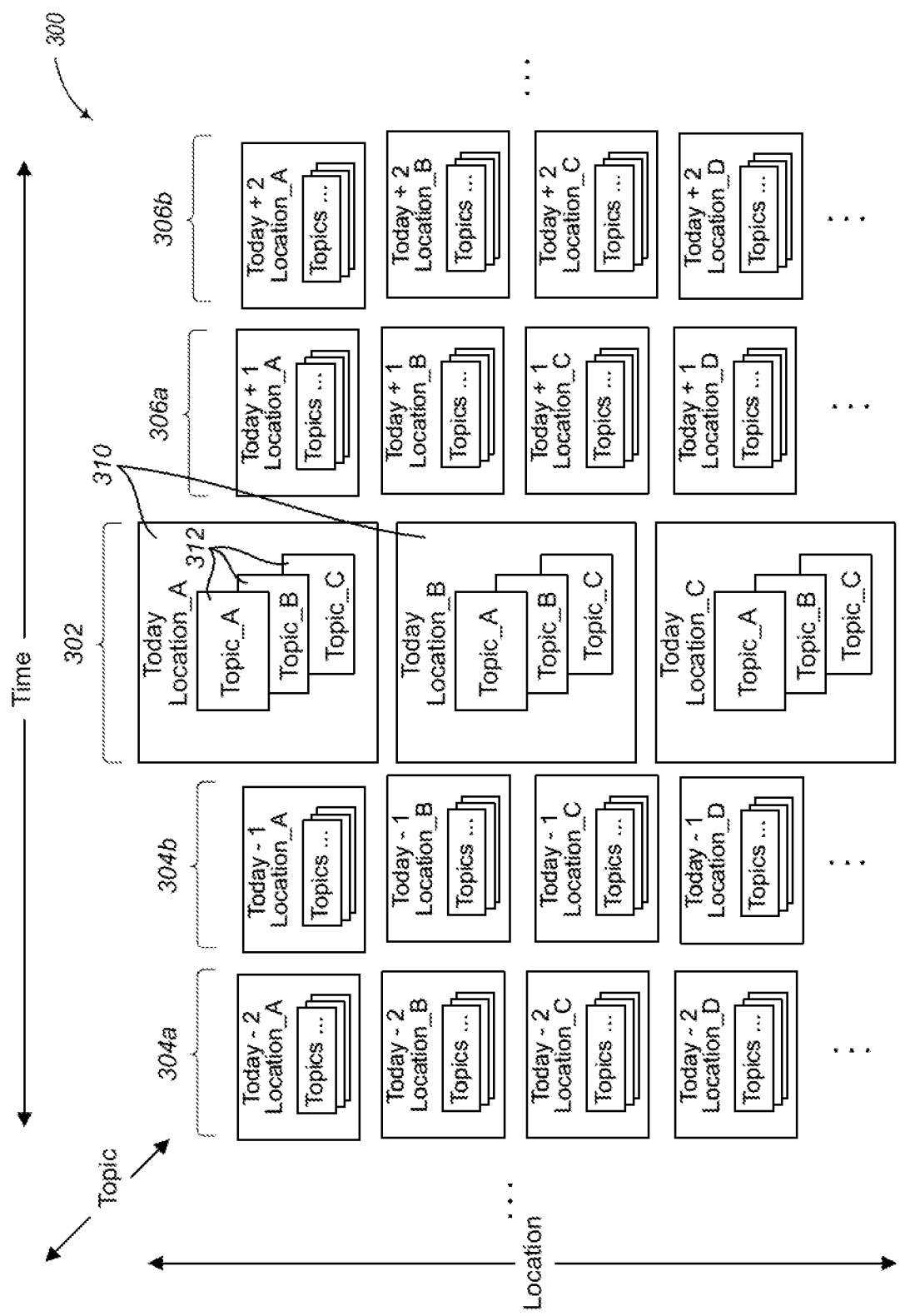
FIG. 3 illustrates another graphical representation of a multi-dimensional fabric user interface for storing content in accordance with embodiments described herein.

FIGS. 2 and 3 illustrate graphical representations of use case examples of a multi-dimensional fabric user interface for storing content in accordance with embodiments described herein.

Example fabric 200 in FIG. 2 includes a time axis 202, a location axis, and a topic axis 206. Although fabric 200 appears to be constrained in each axis, embodiments are not so limited. Rather, fabric or graphical environment is flexible, while the coordinate is fixed. This allows a user to use cruder movements, like the swipe of an arm, to achieve refined movement to arrive at the content. This also reduces the content footprint because it does not need to manage a file structure, which improves throughput to a degree that it can run entirely in the cloud.

In some embodiments, users in the multi-dimensional fabric system navigate by moving the environment, or fabric, to a specific content or item. The content is placed within a 3-Dimensional structure of Time (when)+Location (where)+Topic (what), which may be in the form of a multi-dimensional coordinate system. By configuring the content in the fabric based on 3 dimensions (What, When, Where), the fabric provides a pre-configured scaffold that allows a user to navigate the plurality of content without the multi-dimensional fabric system fetching and organizing it. The fabric makes discovering more relevant content immediately accessible.

The time axis 202 in the multi-dimensional fabric system may be arranged as a plurality of different time periods, such as hours or days. In various embodiments, the current time period (e.g., today) is shown in the middle column 208c, which is shown in FIG. 3. A location axis 204 may be arranged as a plurality of different locations. In some embodiments, the content locations are selected based on a distance from a current location of the display device that is accessing the fabric 200. For example, locations closest to the display device are arranged in the top column 210a and the locations furthest from the display device are arranged in the bottom column 210g. Likewise, topics may be arranged based on themes or nearest to the display device. For example, food content may be in layer 212a, entertainment content in layer 212b, transportation content in layer 212c, etc. In other embodiments, the topics may be arranged based on frequency of access to the user based on location.

The fabric 200 in the multi-dimensional fabric system illustrates a plurality of icons 214 that each represent separate content (also referred to as content cards 214). The content cards 214 are laid out in a plurality of time periods 208a-208e (columns), a plurality of locations 210a-210g (rows), and a plurality of topics 212a-212d (layers), using coordinates associated with the separate dimensions. For any given point defined by (What, When, Where) there is a finite amount of content or data. As a result, users can simply point out a certain What, When, and Where to know where something is located and can directly access it from that point.

In some embodiments of the multi-dimensional fabric system, the location rows 210, time columns 208, and topic layers may be independent from one another such that a user can manipulate a single axis. In other embodiments, the user can manipulate two or more axes. For example, a user can vertically scroll along the location axis 204 through a single column (e.g., single time period on the time axis) of expanded content cards 214, such as column 208c, without affecting the other columns or layers, or the user can vertically scroll along the location axis 204 for multiple columns or multiple layers, or both. Likewise, the user can horizontally scroll along the time axis 202 through a single row (e.g., single location on the location axis) of expanded content cards 214, such as row 210d, without affecting the other rows or layers, or the user can horizontally scroll along the time axis 202 for multiple rows or multiple layers, or both. Moreover, the user can depth scroll along the topic axis 206 through a single layer (e.g., single topic on the topic axis) of expanded content cards 214, such as layer 212a, without affecting the other rows or columns, or the user can depth scroll along the topic axis 206 for multiple rows or multiple columns, or both.

By providing input to one or more axes in the multi-dimensional fabric system, the user can manipulate or move the fabric 200 to access content for a specific time, a specific location, and a specific topic. The user can scroll through expanded content cards 214 on a particular axis by providing one or more hand gestures. For example, a horizontal movement of the user's arm may move the time axis 202, a vertical movement of the user's arm may move the location axis 204, and an in-or-out movement of the user's arm may move the topic axis 206. The user can then select a specific content card 214, such as the content in the middle (along time and location axes) and on top (along the topic axis) of the fabric by moving their arm away from the display screen or by making a first or by opening their hand.

In some embodiments of the multi-dimensional fabric system, the fabric will look two dimensional to a user, but is actually three dimensional, such that when a two-dimensional point is selected by the user, the user can switch axes to view the third dimension. And although FIG. 2 shows the time axis 202 and the location axis 204 on this top-level two-dimensional view, other combinations of axes may also be used, e.g., time v. topic, location v. topic, or other non-illustrated axes.

Figure 5:
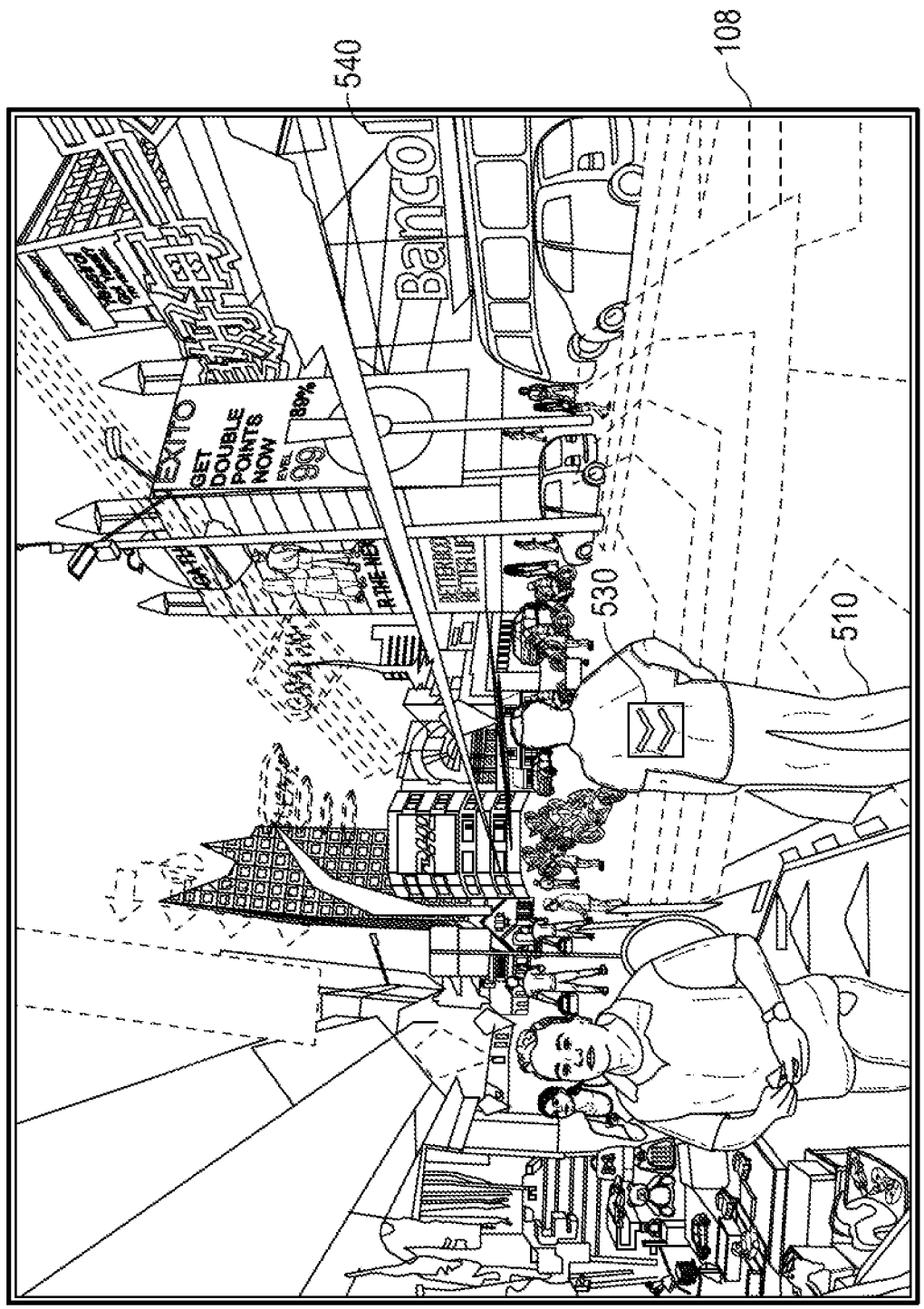
FIG. 5 illustrates a multi-dimensional fabric user interface at a first time that is accessed from disparate virtual and physical spaces via multiple users each having a processor-based device, in which store fronts are viewable but no advertisements are viewable.
Figure 6:
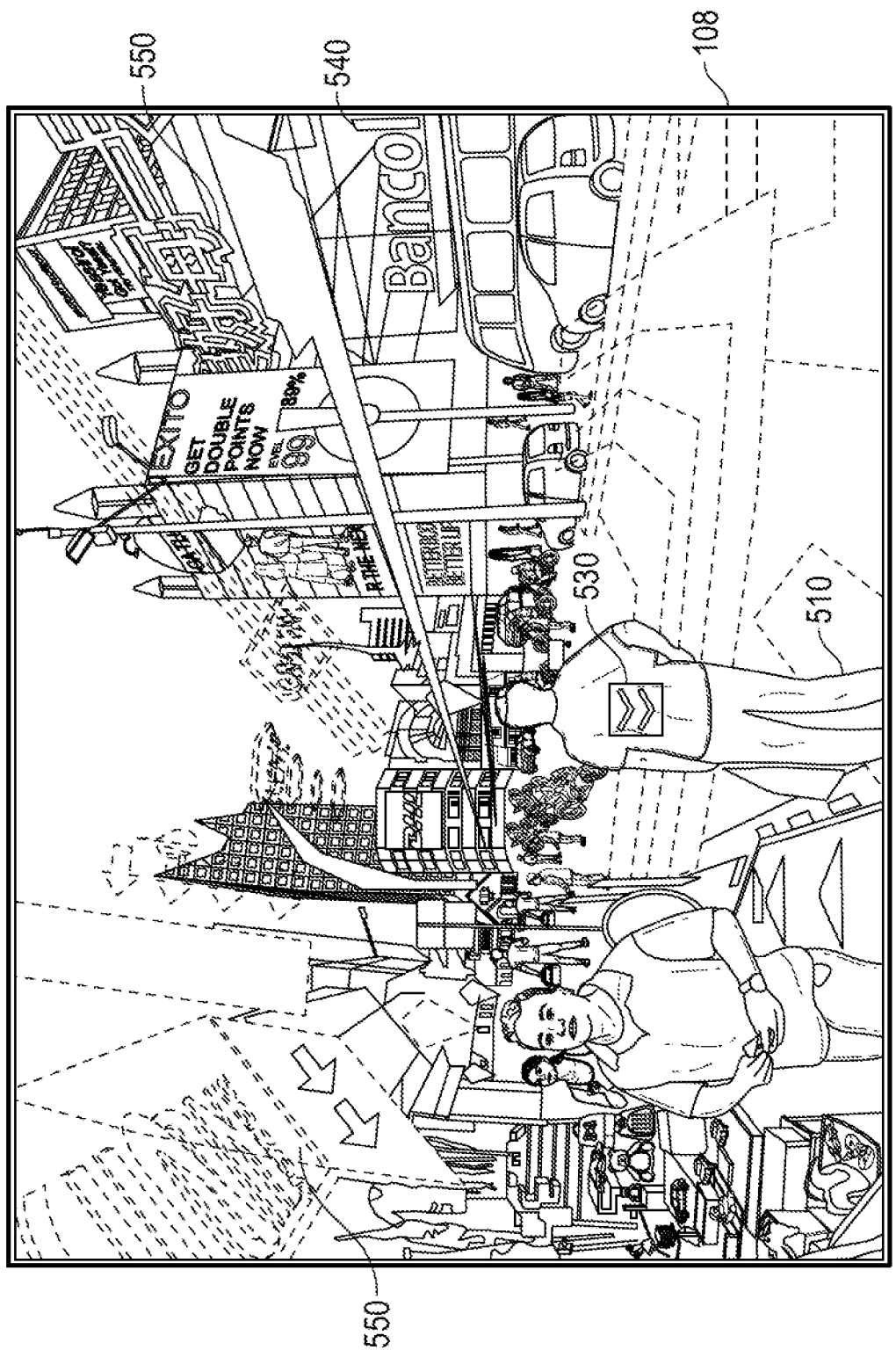
FIG. 6 illustrates a multi-dimensional fabric user interface at a second time that is accessed from disparate virtual and physical spaces via multiple users each having a processor-based device, in which store fronts are viewable and a first group of advertisements are viewable.
Figure 7:
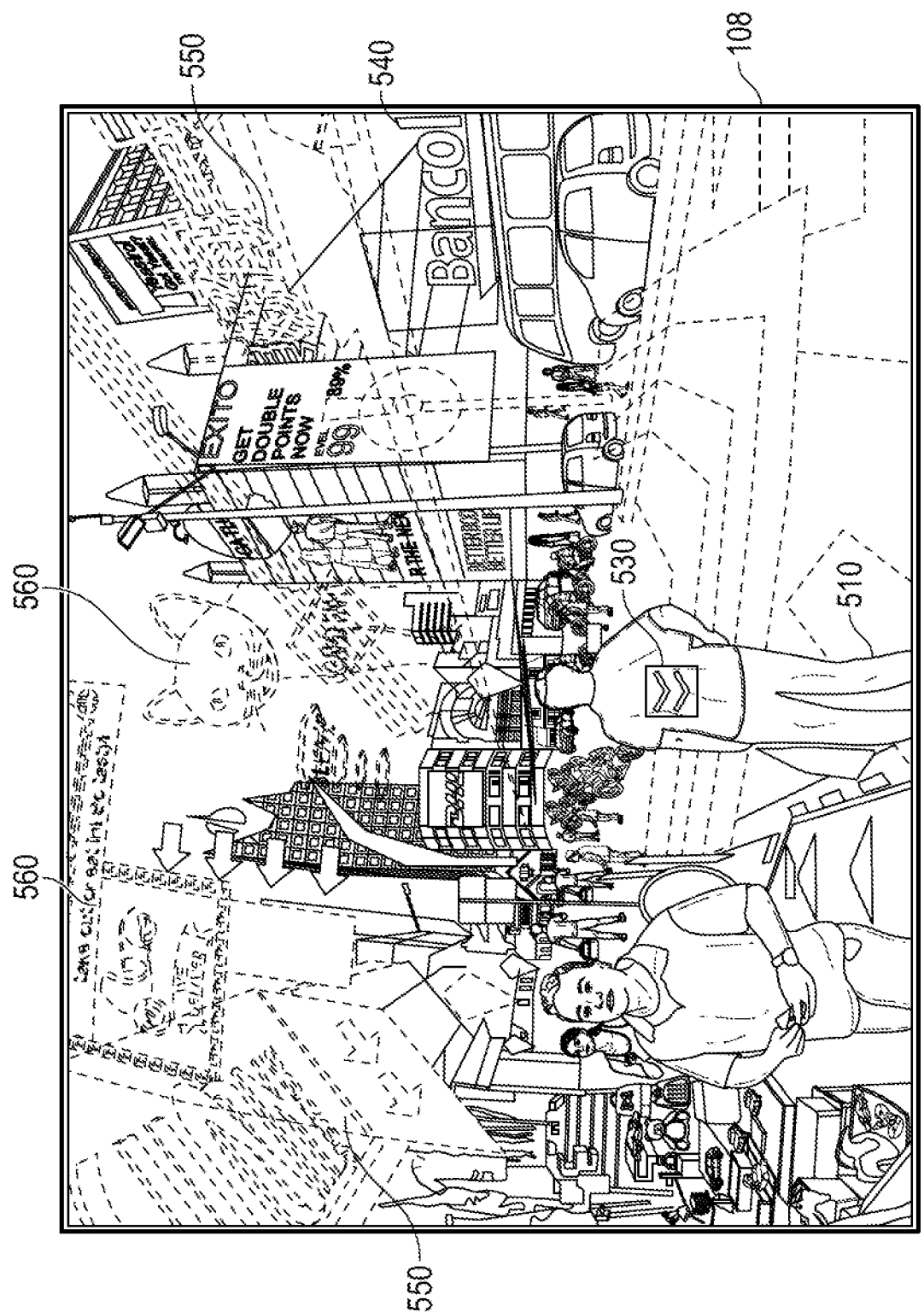
FIG. 7 illustrates a multi-dimensional fabric user interface at a third time that is accessed from disparate virtual and physical spaces via multiple users each having a processor-based device, in which store fronts are viewable and a first and second group of advertisements are viewable.

Example fabric 300 in FIG. 3 is similar to fabric 200 in FIG. 2, but is an example of how the fabric 300 can be displayable to a user outside of a multi-dimensional fabric user interface. Examples of using a multi-dimensional fabric user interface are shown in FIGS. 5-7.

In this example illustration in FIG. 3, a current time period 302 is illustrated in a middle column with future time periods 306a, 306b to the right of the current time period 302 and past time periods 304a, 304b to the left of the current time period. Each location 310 in the current time period 302 includes a plurality of topics 312. These topics 312 are similar to the layers 212 in FIG. 2.

Again, the user in the multi-dimensional fabric system can move or manipulate the fabric 300 along one or more axes to select a particular piece of content. Once selected, the particular content is displayed to the user. Various embodiments, of the multi-dimensional fabric described herein can be used for a variety of different content storage technologies. One example technology is the fluid timeline social network described in U.S. Pat. No. 10,747,414, titled Fluid Timeline Social Network, issued Aug. 18, 2020, which is incorporated herein by reference.

The operation of certain aspects of the disclosure will now be described with respect to FIGS. 4A and 4B. In at least one of various embodiments of the system, process 400 described in conjunction with FIG. 4A may be implemented by or executed by a system of one or more computing devices, such as display device 108 in FIG. 1, and process 500 described in conjunction with FIG. 4B may be implemented by or executed by a system of one or more personal mobile computing devices 124, remote server 102.

Figure 4A:
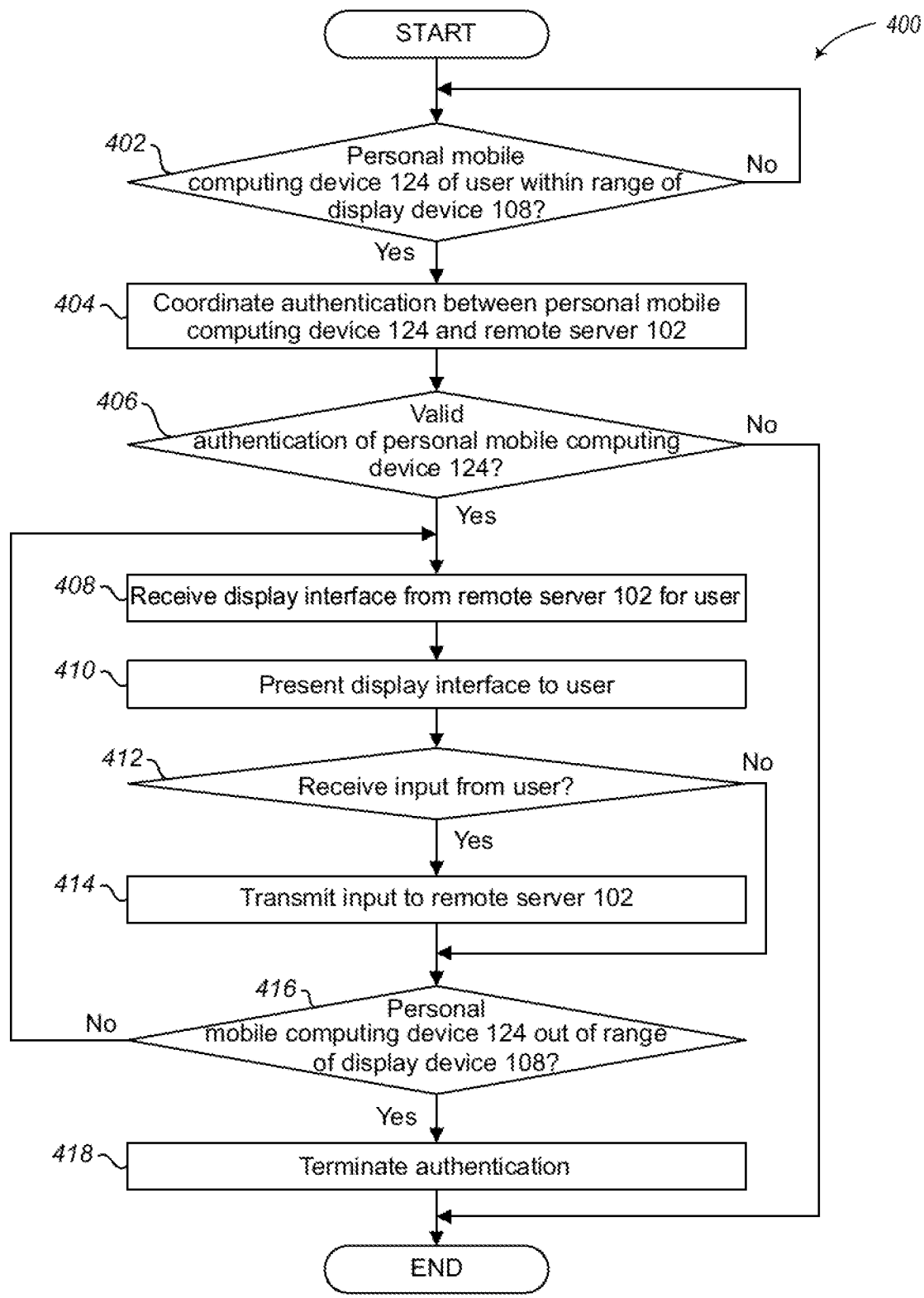
FIG. 4A illustrates a logical flow diagram generally showing one embodiment of a process for accessing a remote server from a display device to present a graphical user interface of a multi-dimensional fabric user interface in accordance with embodiments described herein.

FIG. 4A illustrates a logical flow diagram generally showing one embodiment of a process 400 for accessing a remote server from a display device 108 to present a graphical user interface of a multi-dimensional fabric in accordance with embodiments described herein.

Process 400 begins, after a start block, at decision block 402, where a determination is made whether a personal mobile computing device 124 of a user is within range of the display device 108. This determination may be made when the personal mobile computing device 124 is within a threshold distance from the display device 108 (e.g., using one or more range detection devices) or when the user indicates or requests to interact with the display device. If the personal mobile computing device 124 is within range of the display device 108, then process 400 flows to block 404; otherwise process 400 loops to decision block 402 until a personal mobile computing device is within range of the display device.

At block 404, the display device 108 coordinates authentication between the personal mobile computing device 124 and a remote server 102. This coordination may include obtaining, requesting, or otherwise forwarding authentication keys or other information to determine the validity or authenticity of the personal mobile computing device 124 as being authorized to access the remote server 102.

Process 400 proceeds to decision block 406, where a determination is made whether the personal mobile computing device 124 is validly authenticated with the remote server 102. In some embodiments, the remote server may provide a token, session identifier, or other instruction to the display device 108 indicating that the user of the personal mobile computing device 124 is authorized to access the remote server via the display device 108. If the personal mobile computing device 124 is valid, then process 400 flows to block 408; otherwise, process 400 terminates or otherwise returns to a calling process to perform other actions.

At block 408, the display device 108 receives a display interface from the remote server 102 for the user. In various embodiments, the display interface is customized for the user, such as if the user logged directly onto the remote server 102 to access personal content. As described herein, this display interface is a multi-directional fabric that the user can manipulate, as described herein.

Process 400 continues at block 410, where the display device 108 presents the display interface to the user of the personal mobile computing device 124. In some embodiments, the display interface is displayed directly by the display device 108. In other embodiments, the display interface is displayed via the personal mobile computing device 124.

Process 400 proceeds next to decision block 412, where a determination is made whether the display device 108 has received input from the user. As described herein, the input may be provided via a hand gesture without touching a screen of the display device 108. Such hand gesture may be a swipe left or right, swipe up or down, or movement towards or away from the screen of the display device 108. A selection input can then be received if the user rapidly moves their hand away from the screen of the display device 108 or if the user opens or closes his/her hand. If user input is received, then process 400 flows to block 414; otherwise, process 400 flows to decision block 416.

At block 414, the display device 108 transmits the user input to the remote server 102. Process 400 proceeds to decision block 416, where a determination is made whether the personal mobile computing device 124 is out of range of the display device 108 (e.g., outside of a threshold distance or the user de-activated the session. If not, process 400 loops to block 408 to receive an updated or modified display interface (based on the user input) and presents it to the user. If the personal mobile computing device 124 is out of range of the display device 108, then process 400 flows to block 418 to terminate the authentication with the remote server 102.

After block 418, process 400 may terminate or otherwise return to a calling process to perform other actions. In some embodiments, process 400 may loop to decision block 402 to wait for another personal mobile computing device 124 to be within range of the display device 108.

Figure 4B:
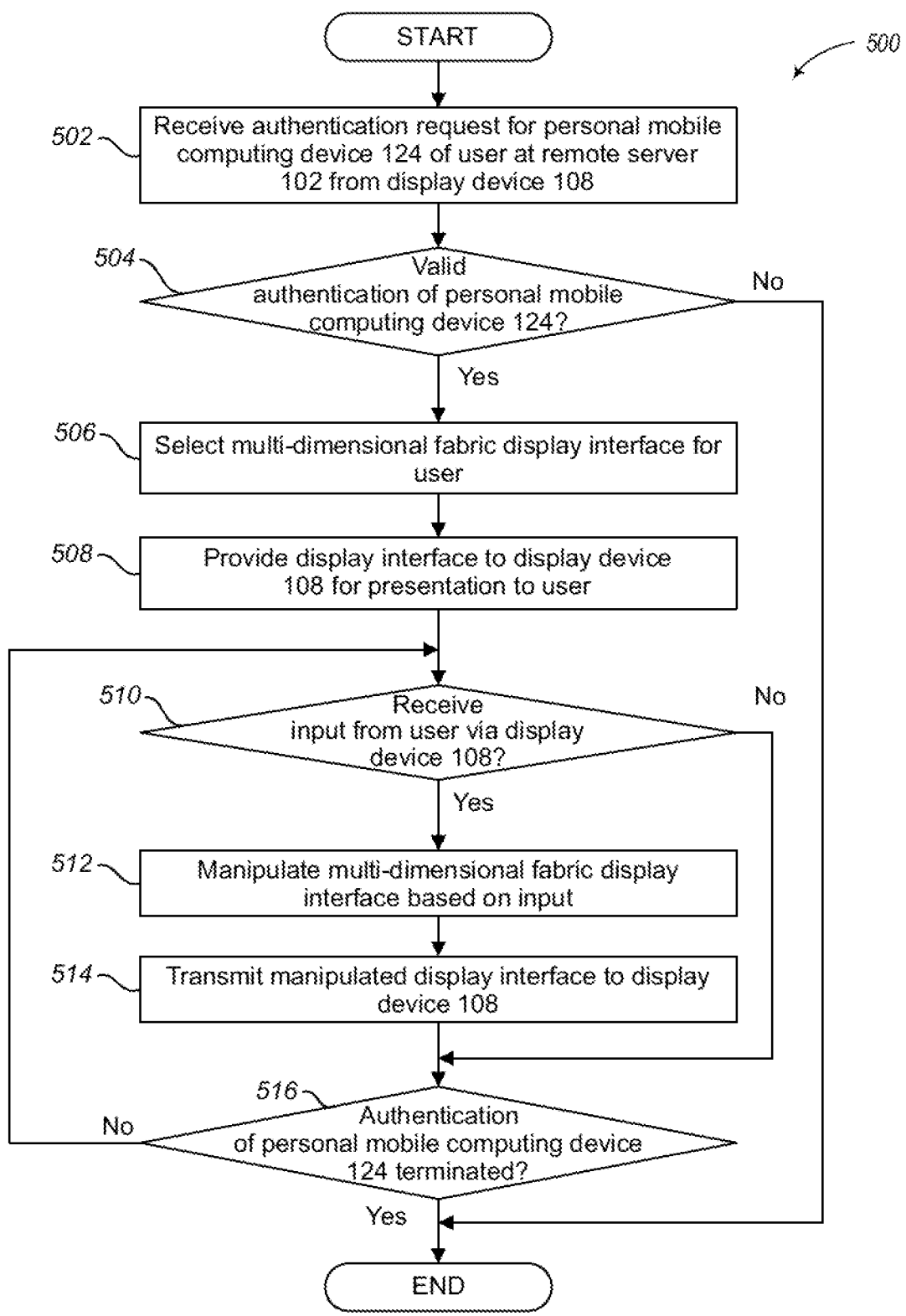
FIG. 4B illustrates a logical flow diagram generally showing one embodiment of a process for a remote server to provide a graphical user interface of a multi-dimensional fabric user interface to a display device in accordance with embodiments described herein.

FIG. 4B illustrates a logical flow diagram generally showing one embodiment of a process 500 in the system for a remote server 102 to provide a graphical user interface of a multi-dimensional fabric to a display device 108 in accordance with embodiments described herein.

Process 500 begins, after a start block, at block 502, where an authentication request is received at a remote server 102 from a display device 108 for a personal mobile computing device 124 of a user. In some embodiments, the authentication request may include encryption keys, user credentials, or other authentication information.

Process 500 proceeds to decision block 504, where a determination is made whether the personal mobile computing device 124 is validly authenticated or not. If the personal mobile computing device 124 is valid, process 500 flows to block 506; otherwise, process 500 terminates or otherwise returns to a calling process to perform other actions.

At block 506, the remote server 102 selects a multi-dimensional fabric display interface for the user of the personal mobile computing device 124. In some embodiments, the remote server 102 instantiates or accesses a previously running version of the multi-dimensional fabric operating system for the user. In various embodiments, each separate user (or a group of multiple users) has a corresponding multi-dimensional fabric user interface accessible via the remote server 102. The multi-dimensional fabric display interface with content laid out in a fabric-like structure based on at least time, location, and topic such that the user can manipulate or move the fabric in one or more dimensions to select content.

Process 500 proceeds to block 508, where the remote server 102 provides the selected display interface to the display device 108 for presentation to the user. Process 500 continues at decision block 504, where a determination is made whether user input has been received from the display device 108. In various embodiments, the input may be a change or selection of one or more dimensions of the fabric or a user selection. If user input has been received, process 500 flows to block 512; otherwise, process 500 flows to decision block 516.

At block 512, the remote server 102 manipulates the multi-dimensional fabric display interface based on the user input. In some embodiments, the manipulated display interface may include displaying specific content selected by the user. In other embodiments, the manipulated display interface may show a different section or area of the multi-dimensional fabric user interface based on the user input.

Process 500 proceeds next to block 514, where the remote server 102 transmits the manipulated display interface to the display device 108. Process 500 continues next at decision block 516, where a determination is made whether the authentication of the personal mobile computing device 124 has terminated. In some embodiments, the display device 108 transmits a termination request to the remote server 102 when the user of the personal mobile computing device 124 walks away from or is out of range of the display device 108. If the authentication is terminated, process 500 terminates or otherwise returns to a calling process to perform other action; otherwise, process 500 loops to decision block 510 to receive additional user input from the display device 108.

Referring now to FIGS. 5, 6, and 7, the system displays a multi-dimensional fabric user interface that may be accessed from disparate virtual and physical spaces by a user 510, each having a processor-based computing device, such as a computer, smart phone, smart watch, or the like, such as the personal mobile computing devices 124 or display devices 108 shown in FIG. 1. The user 510 may enter the multi-dimensional fabric user interface at a virtual location and at a virtual time. Additionally, as will be described in further detail below, filters are also employed by the system to control what each user 510 sees and experiences in the multi-dimensional fabric user interface, thus enabling user-control of the "what," "where," and "when." In this manner, the "where" is the virtual location within the multi-dimensional fabric user interface that corresponds to an actual physical location that the user 510 selects to visit. Next, the "when" is the time of day and date at which the user selects to visit. Finally, the "what" is the content that is visible to the user to see and interact with based on the filters selected by the user 510.

Accordingly, users with the same user-selectable filters enabled have the same virtual experience in the multi-dimensional fabric user interface, while users with different user-selectable filters enabled have different virtual experiences in the multi-dimensional fabric user interface while still being in the same virtual environment. In some embodiments, the user 510 may interact with the virtual location in the multi-dimensional fabric user interface to buy or sell goods or content, upload content to or download content from the multi-dimensional fabric, post, live stream, and the like. In one or more embodiments, the user 510 interacts with the multi-dimensional fabric user interface by anchoring digital content 520 to a fixed location in the multi-dimensional fabric user interface. In other embodiments, the user 510 interacts with the multi-dimensional fabric user interface by anchoring digital content 530 to a user 510 (e.g., himself, herself, or another user) in the multi-dimensional fabric user interface.

In another aspect of some embodiment, the user 510 enters the multi-dimensional fabric user interface from different physical locations, each using their own processor-based computing device 124. The user 510 may go to the multi-dimensional fabric user interface, which may be configured to represent an actual location in the real world. The multi-dimensional fabric user interface may contain virtual store fronts 540 of actual stores in the physical world. The multi-dimensional fabric user interface may also contain advertisements 550, 560 in the multi-dimensional fabric user interface at a specific physical location, as shown in FIGS. 6 and 7.

Specifically, FIG. 5 shows a multi-dimensional fabric user interface that provides a virtual representation of an actual physical location at a first time that contains virtual store fronts 540 but which contains no advertisements, as shown on a display device 108. FIG. 6 shows a multi-dimensional fabric user interface that provides a virtual representation of an actual physical location at a second time that contains virtual store fronts 540 and which contains advertisements 550, as shown on a display device 108. FIG. 7 shows a multi-dimensional fabric user interface that provides a virtual representation of actual physical location at a third time that contains virtual store fronts 540 and which contains advertisements 550 and advertisements 560, as shown on a display device 108.

In some embodiments, the advertisements 550, 560 in the multi-dimensional fabric user interface at a specific physical location, such as a billboard on a specific street (e.g., Sunset Boulevard in Los Angeles, Calif.) may display the same advertisement as in the actual physical world, while in other embodiments the advertisements 550, 560 in the multi-dimensional fabric user interface at a specific physical location may display different advertisements if a user 510 anchors different digital content 520 at that virtual location (which represents an actual physical location). The multi-dimensional fabric user interface is created by anchoring digital content 520 to virtual locations that represent physical locations, not by digitizing the actual physical locations. In various embodiments, digital content 520 is anchored to a location and time within the multi-dimensional fabric user interface by the corresponding storage location of the content.

Various embodiments, of the multi-dimensional fabric described herein can be used for a variety of different content storage technologies. One example technology is the fluid timeline social network described in U.S. Pat. No. 10,747,414, which is incorporated herein by reference.

Significantly, the user 510 may choose to visit not only a specific place, but also a specific time in the multi-dimensional fabric user interface. For example, the user 510 of the multi-dimensional fabric user interface may choose to go to a specific physical location in the past at a specific time and date (e.g., go to a concert venue when a specific concert occurred, go to a historical location when a historical event occurred, go to a restaurant when a friend's birthday occurred, go to a church when a relative's wedding occurred, and the like). As shown in FIGS. 5, 6, and 7, in these embodiments the system displays the objects and events that are anchored to that specific location and time. This is distinct from the embodiments shown in FIGS. 2 and 3 where time and distance were used as axes. Additionally, the user 510 of the system may choose to go to a specific physical location in the future at a specific time and date (e.g., go to a concert venue when a specific concert will occur, go to a historical location when a historical event will likely occur, go to a restaurant when a friend's birthday will occur, go to a church when a relative's wedding will occur, and the like). Further, a user 510 may want to go to a location in the future and see what mobile vendors (i.e., food trucks) are available at a particular location. Moreover, in some embodiments, virtual store fronts 540 are dynamically tailored with advertisements that are set at fixed locations for a fixed time period, or as part of a live feed. A user 510 may also post advertisements 550, 560 at a time adjacent to future event or sale. In various embodiments, digital content 520 is anchored to a specific time and date by the corresponding storage time of the content within the multi-dimensional fabric.

Figure 8:
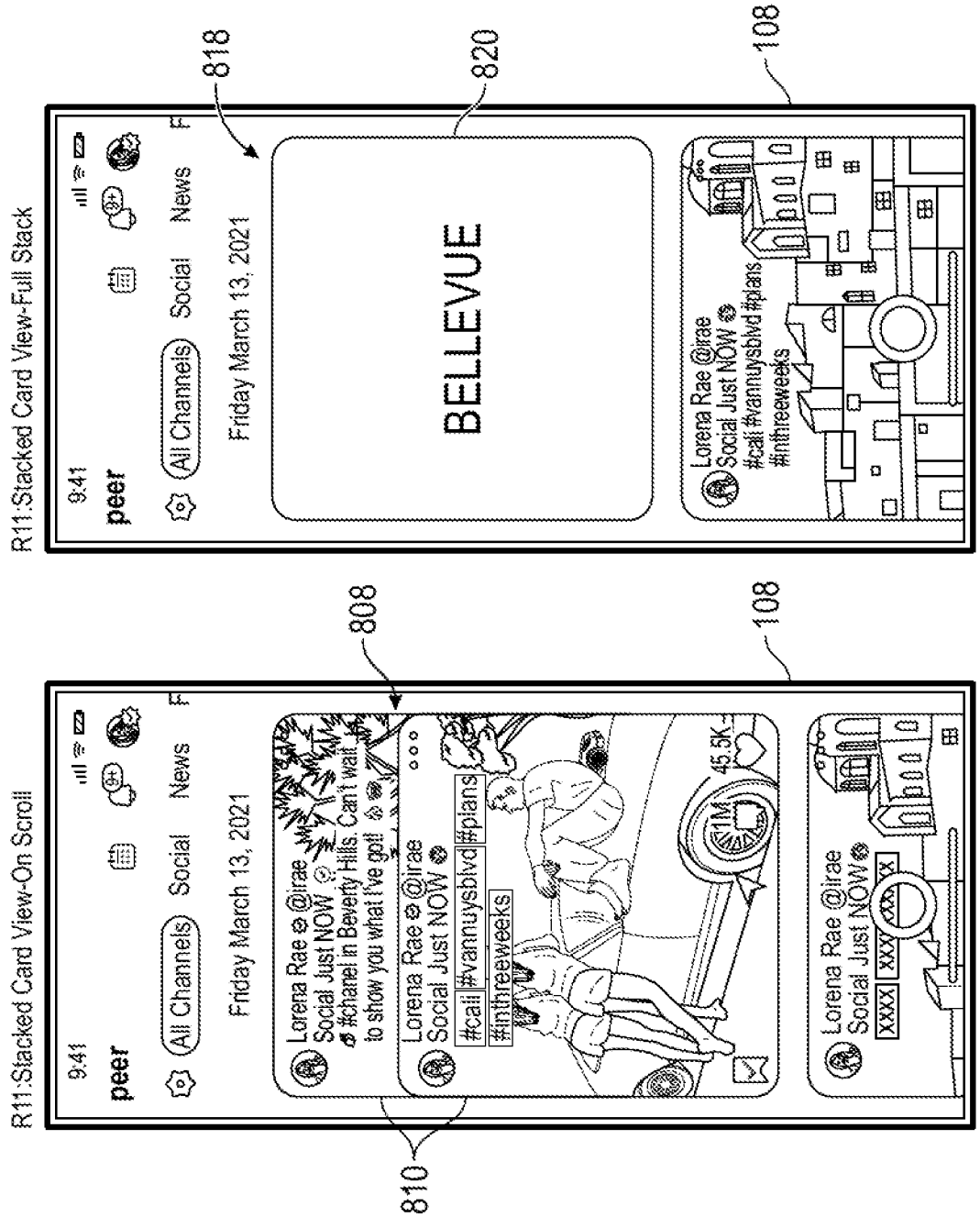
FIG. 8A illustrates a selection of scrolling and expanded content cards that may be selected by a user to enable what information is seen and experienced in the multi-dimensional fabric user interface, in accordance with embodiments described herein.
FIG. 8B illustrates a selection of group and stacked (i.e., collapsed) content cards that have already been viewed by a user in the multi-dimensional fabric user interface, in accordance with embodiments described herein.

Referring now to FIGS. 8A and 8B, FIG. 8A illustrates a display device 108 with scrolling and expanded content cards 810 in the multi-dimensional fabric user interface. The content cards 810 may each be selected by the user to present the information associated with the selected content card in the multi-dimensional fabric user interface. The row of channels is present across the top of the display device 108. The date and time is also displayed, which represents another scrolling axis. In this embodiment, the scrolling and expanded content cards 810 in the multi-dimensional fabric user interface relate to the location (e.g., a city) being searched or otherwise viewed. Multiple overlapping content cards 810 are shown that the user can scroll through with a vertical (e.g., up or down) swiping motion. In another aspect of some embodiments, the user can scroll along other axes (e.g., horizontal) with appropriate swiping motions.

As described herein, expanded content cards 810 are content cards that are substantially non-overlapping so that a user may easily scroll through the cards and see all of the information provided on the expanded content cards 810. As also described herein, grouped and stacked content cards 810 are cards that have been collapsed into a deck 820 of content cards, like a physical deck of cards. A deck 820 of stacked content cards are substantially overlapping so that a user may not see all of the information provided on the content cards 810 when they are grouped and stacked. However, a user may be able to scrolling between multiple decks 820 of content cards.

Referring now to FIG. 8B, the same display device 108 is shown from FIG. 8B, but at a later time. In FIG. 8B, the user has already viewed and scrolled through the content cards 810, so now the system has collapsed the deck of content cards 801 into a stacked group (i.e., deck 820) of content cards in the multi-dimensional fabric user interface. The row of channels is still present across the top of the screen. Once again, the date and time is also displayed, which represents another scrolling axis. Notably, the user is still able to select the deck of content cards 810 and re-expand the content cards 810 so that the user can again view the information associated with the content cards 810 in the selected deck 820 with the multi-dimensional fabric user interface.

In another aspect of the system, the user may scroll through decks 820 of content cards 810 that are related to other locations (e.g., cities) in the multi-dimensional fabric user interface being searched or otherwise viewed. Multiple decks 820 of content cards 810 may be scrolled through by the user through a vertical (e.g., up or down) swiping motion or along other axes (e.g., horizontal) with appropriate swiping motions. In addition to scrolling through locations (i.e., where), the user may also scroll through time content (i.e., when) and channel content (i.e., what) by swiping along other axes.

The user can also use the display device 108 to access a remote server 102, group a plurality of content cards 810 into a plurality of decks 820 of content cards, and display the plurality of decks 820 of content cards in stacked form on the display device 108 in the multi-dimensional fabric operating system 104. In some embodiments, of the multi-dimensional fabric user interface, the system for dynamically grouping and displaying a plurality of content 100 enables the user to group the plurality of content cards 810 based on one or more characteristics of the content into a plurality of decks 820. In one embodiment, the one or more characteristics includes whether or not the deck 820 of content cards has been viewed by the user (e.g., the decks 820 of content cards are stacked after they have been scrolled though, manipulated, or otherwise viewed, by the user). Thus, in such an embodiment, stacked content cards 810 represent fully read content by the user.

In other embodiments, of the multi-dimensional fabric user interface, the system for dynamically grouping and displaying a plurality of content 100 automatically groups the plurality of content cards 810, without requiring any action of the user to intentionally group the cards, based on one or more characteristics of the content into a plurality of decks 820.

In some such embodiments, the system for dynamically grouping and displaying a plurality of content 100 monitors the user's actions and interactions with virtual objects and content cards 810 in the multi-dimensional fabric user interface. The system for dynamically grouping and displaying a plurality of content 100 then analyzes the characteristics of those actions and interactions with virtual objects and content cards 810 and determines rules from those actions and interaction that may be used to initiate future actions by the system using the rules that have been learned by the system. In one non-limiting example, positive actions towards topic A, location X, or both may become a grouping technique. In another non-limiting example, negative actions towards topic B, location Y, or both may become a grouping technique. In still another non-limiting example, indifferent actions towards topic C, location Z, or both may become a grouping technique.

By way of example only, and not by way of limitation, positive actions may include repeatedly selecting a same characteristic of action or interaction, lingering for long periods of time on actions or interactions with a same characteristic, and executing an operator or transaction in association with a same characteristic of actions or interactions, such as making a reservation, making a purchase, entering a positive comment, entering a "like" of an item or event, initiating a subscription, downloading an item or content, and "following" a person, business, or organization.

By way of example only, and not by way of limitation, negative actions may include not repeatedly selecting a same characteristic of action or interaction, not lingering for long periods of time on actions or interactions with a same characteristic, and executing an operator or transaction in association with a same characteristic of actions or interactions, such as cancelling a reservation, cancelling a purchase, entering a negative comment, entering a "dislike" of an item or event, cancelling a subscription, and ending the "following" a person, business, or organization.

By way of example only, and not by way of limitation, indifferent actions may include situations where the system cannot determine any difference in a positive or negative correlation between content viewed by the user and actions taken by the user. In some embodiments, machine learning may be implemented to enable the system to continue to improve its correlations and determinations to learn and optimize future grouping actions.

Each deck 820 is displayable in either an expanded form 808 or a collapsed form 818 on a display device. Thus, in one embodiment, the system for dynamically grouping and displaying a plurality of content 100 enables the user to display a first selected deck 820 of content cards in the collapsed form 818 in response to a user action. In another embodiment, the system for dynamically grouping and displaying a plurality of content 100 enables the user to display a second selected deck of content cards in the expanded form 808 in response to a second user action.

In one implementation, a user is in Bellevue and looking for nearby restaurants. As the user scrolls through a deck of expanded content cards 810 that contain information on nearby restaurants, the content cards 810 for each restaurant that the user views are stacked together in a collapsed form 818, similar to a deck 820 of playing cards. Thus, in this implementation, similar content (i.e., Bellevue restaurants), is automatically grouped together after it is viewed by the user. These groupings of content cards may also be sub-grouped by another characteristic (e.g., distance or time) from the user's current location.

In one example of a non-limiting embodiment, if the user selects specific types of restaurants (e.g., fast food, sit down, Mexican, Italian, food truck, and the like) then the system generates sub-groups of different types of food that is shown in content cards 810.

In some such embodiments, when new content cards 810 are posted, the new content cards are not automatically grouped or stacked until after the user scrolls through or otherwise views the expanded content cards. In this manner, it is more efficient for a user to identify new content cards 810 that have been added.

In another example of a non-limiting embodiment, if the user first looks for restaurants in the location of the city of Bellevue, the content cards 810 for those restaurants that are viewed by the user are grouped as described herein. Continuing in this embodiment, if at a later time (e.g., one month later), the user again looks for restaurants in Bellevue, any new content cards 810 can be displayed in an expanded manner with the previously grouped cards. If the user interacts with this new card, such as by scrolling, clicking, posting, or the like, then the interacted with content cards 810 would be stacked with the other content cards 810 from Bellevue.

In one or more embodiments of the system for dynamically grouping and displaying a plurality of content 100, the user may scroll in one direction (e.g., vertically) through the plurality of decks 820 of expanded content cards to see all of the content cards 810, while the user may scroll in another direction (e.g., horizontally) to navigate between stacked decks of content cards 810. In other embodiments of the system for dynamically grouping and displaying a plurality of content 100, the user may scroll in one direction (e.g., vertically) through the plurality of decks 820 of expanded content cards 810 to search through the time parameter of the content, while the user may scroll in other directions (e.g., horizontally) to navigate between type of content in the content cards 810 and/or the location of the content in the content cards 810.

In one or more embodiments, the system may access weather data for the near future and display the forecast weather at a particular location and date at a near future date that is within weather forecasting capabilities. Of course, the display of the recorded weather at a particular location and date in the past or at the present may also be generated by the system.

In some embodiments, the system for dynamically grouping and displaying a plurality of content 100 then analyzes the characteristics of those actions with respect to events and services during a particular weather pattern, and determines rules from those weather affected-actions that may be used to initiate future actions (e.g., grouping actions) by the system. In one non-limiting example, negative actions towards outdoor parks during raining weather may become a grouping technique. In another non-limiting example, positive actions towards movie theaters during raining weather may become a grouping technique. In still another non-limiting example, positive actions towards beach activities during sunny weather may become a grouping technique. In yet another non-limiting example, negative actions towards indoor activities during sunny weather may become a grouping technique.

Figure 9:
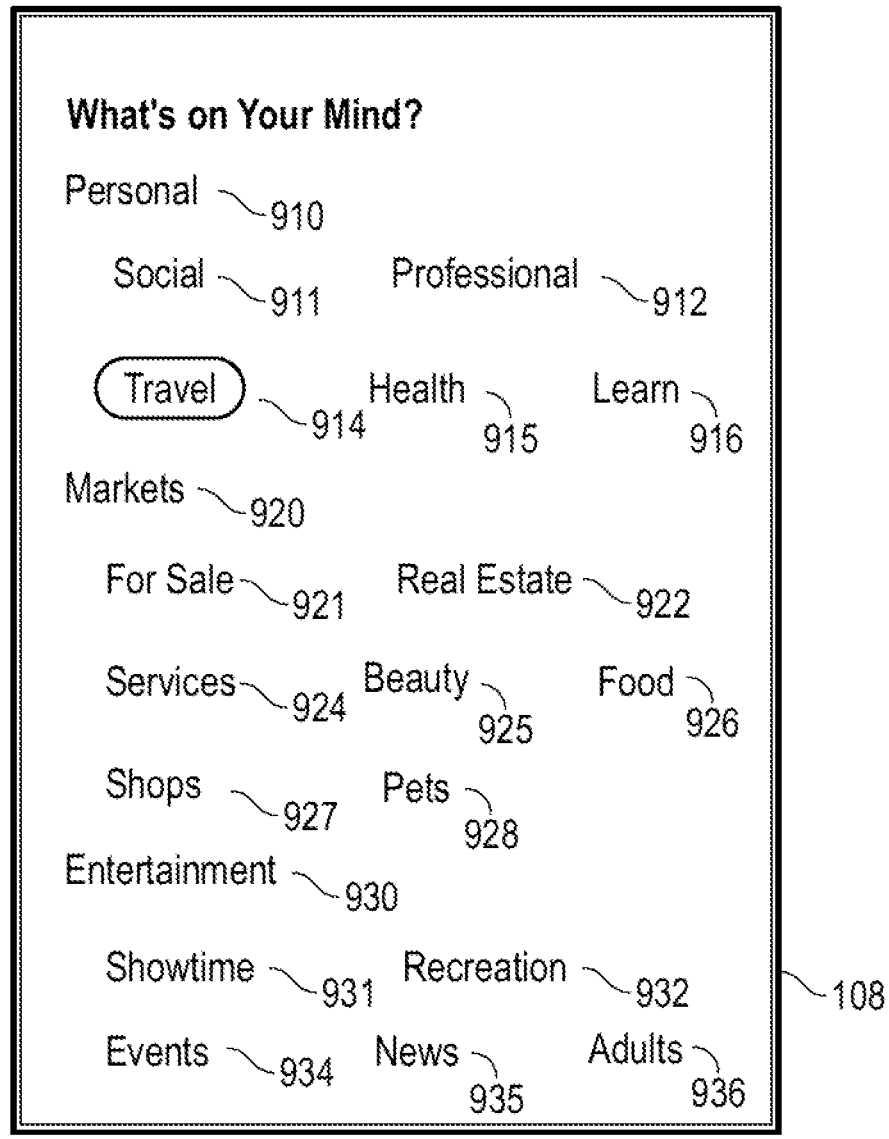
FIG. 9 illustrates a selection of filters that may be selected by a user to enable what locations and events are seen and experienced in the multi-dimensional fabric user interface, in accordance with embodiments described herein.

Examples of various user filters that can be enabled are shown on the display device 108 in FIG. 9, which include Personal 910, Markets 920, and Entertainment 930. These filters are presented by way of example only and not by way of limitation. In some such embodiments, the Personal 910 filter includes, by way of example only, and not by way of limitation, sub-filters of: social 911, professional 912, travel 914, health 915, and learn 916. In some embodiments, the system for dynamically grouping and displaying a plurality of content 100 analyzes user's actions and correlates positive or negative association with one or more of these sub-filters 911, 912, 914, 915, and 916, which the system can then implement for future grouping actions. In the embodiment shown in FIG. 9, the Travel filter 914 has been selected. Additionally, in some such embodiments, the Markets 920 filter includes, by way of example only, and not by way of limitation, sub-filters of: for sale 921, real estate 922, services 924, beauty 925, food 926, shops 927, pets 928. Again, some embodiments of the system for dynamically grouping and displaying a plurality of content 100 analyze user's actions and correlate positive or negative association with one or more of these sub-filters 921, 922, 924, 925, 926, 927, and 928, which the system can then implement for future grouping actions.

Furthermore, in some such embodiments, the Entertainment 930 filter includes, by way of example only, and not by way of limitation, sub-filters of: showtime 931, recreation 932, events 934, news 935, weather, adults 936, and the like. Still again, some embodiments of the system for dynamically grouping and displaying a plurality of content 100 analyze user's actions and correlate positive or negative association with one or more of these sub-filters 931,932, 934, 935, and 936, which the system can then implement for future grouping actions. As shown on the display devices 108 in FIGS. 10A, 10B, 10C other filters include, by way of example only, and not by way of limitation, vendors 940, restaurants 960, coffee 980, and the like. The sub-groups of these filters may be analyzed, correlated, and grouped in the same manner as described above with respect to the sub-filters of FIG. 9.

Figure 10:
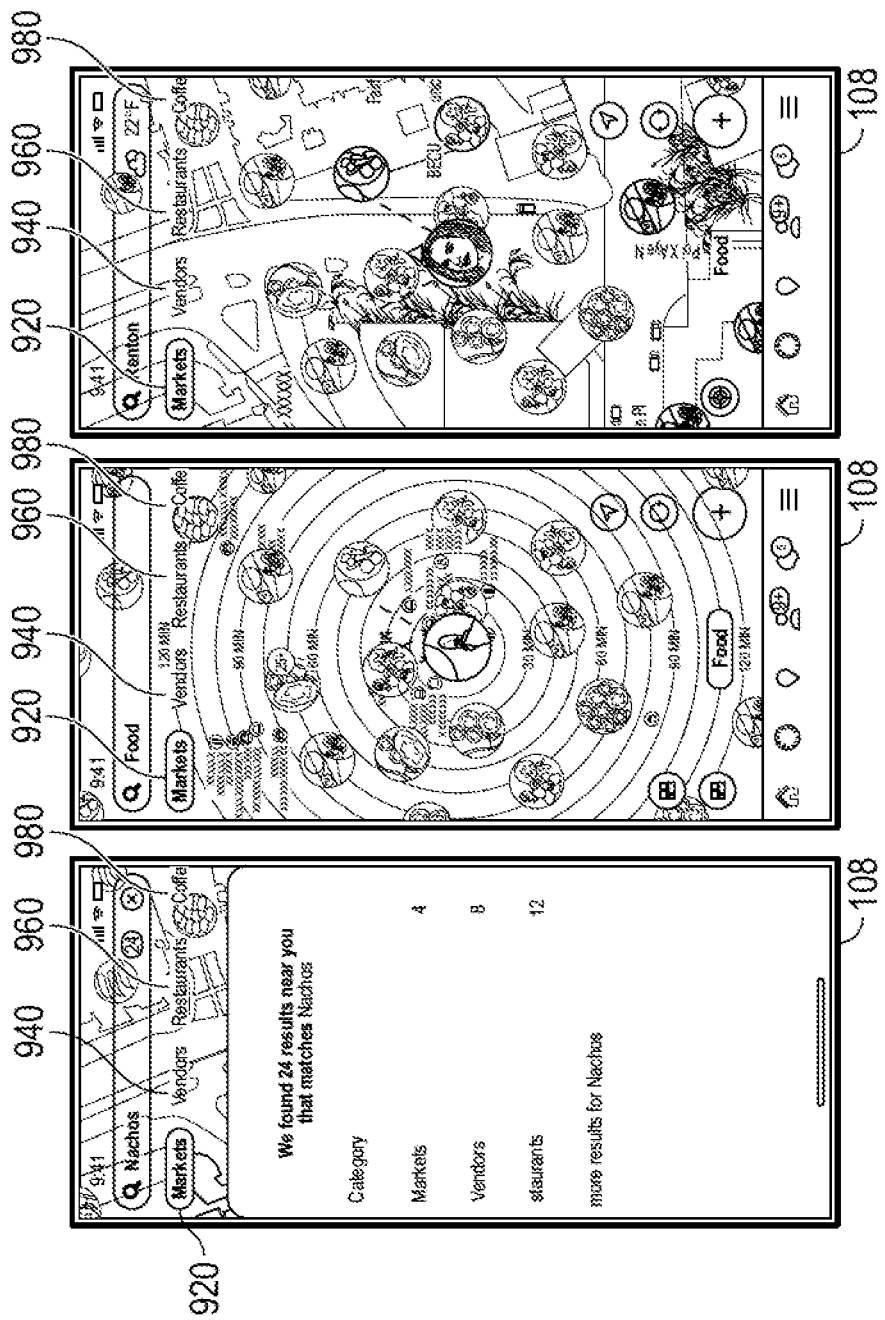
FIG. 10A illustrates a view of the multi-dimensional fabric user interface with various selected filters and search parameters entered by a user to enable what locations and events are seen and experienced, in accordance with embodiments described herein.
FIG. 10B illustrates another view of the multi-dimensional fabric user interface with various selected filters and search parameters entered by a user to enable what locations and events are seen and experienced, in accordance with embodiments described herein.
FIG. 10C illustrates still another view of the multi-dimensional fabric user interface with various selected filters and search parameters entered by a user to enable what locations and events are seen and experienced, in accordance with embodiments described herein.

Referring still to FIGS. 10A, 10B, 10C the locations or events that are visible in each instance of the multi-dimensional fabric user interface, as shown on the display devices 108, are controlled by the filters selected by the user. For example, what you see in the way of store fronts is controlled by filters. Each party has a multi-dimensional fabric user interface, but that interface or the content shown within the interface may appear different due to their own filters. Additionally, filters may also be used in combination with search criteria to present different iterations of the multi-dimensional fabric user interface. For example, in one instance shown in FIG. 10A, the user is performing a search for nachos and the system retrieves numerous search results. In this instance, the filter Markets 920 is selected, while the filters of vendors 940, restaurants 960, coffee 980, are not selected. In another iteration instance shown in FIG. 10B, the user is searching for food and viewing the search results in a circular time-space distribution of food locations and events. Again in this instance, the filter Markets 920 is selected, while the filters of vendors 940, restaurants 960, coffee 980, are not selected. In still another iteration instance shown in FIG. 10C, the user is searching the city of Renton for July 4th. In this iteration, the user may be able to see and interact with various shops, advertisements, and other users that happen to be at that same location and time, e.g., in Renton on July 4th. Once again in this instance, the filter Markets 920 is selected, while the filters of vendors 940, restaurants 960, coffee 980, are not selected.

In another aspect of some embodiments, the system for dynamically grouping and displaying a plurality of content 100 implements different rules, such as grouping actions, for a first location than those that are implemented for a second location. For example, when the user 510 is located in a first location, such as Bellevue, the system may implement grouping actions that correlate with preferred events, objects, or services in that first location, while when the user 510 is located in a second location, such as Seattle, the system may implement different grouping actions that correlate with different preferred events, objects, or services in that second location.

In some embodiments of the system, a user may select whether or not they wish to be viewable by other users when visiting a specific location and time within the multi-dimensional fabric user interface. If the user selects to be viewable by other users when visiting a specific location and time within the multi-dimensional fabric user interface, then the user may be seen and interacted with by other users at that same virtual location, date, and time. If the user selects not to be viewable by other users (i.e., anonymous) when visiting a specific location and time within multi-dimensional fabric user interface, then the user may not be seen and interacted with by other users at that same virtual location, date, and time. In another aspect of some embodiments, acceptance into the multi-dimensional fabric user interface is usually required. The user selection of whether or not they are to be viewable may be set by location, time, or a combination of location and time.

Figure 11:
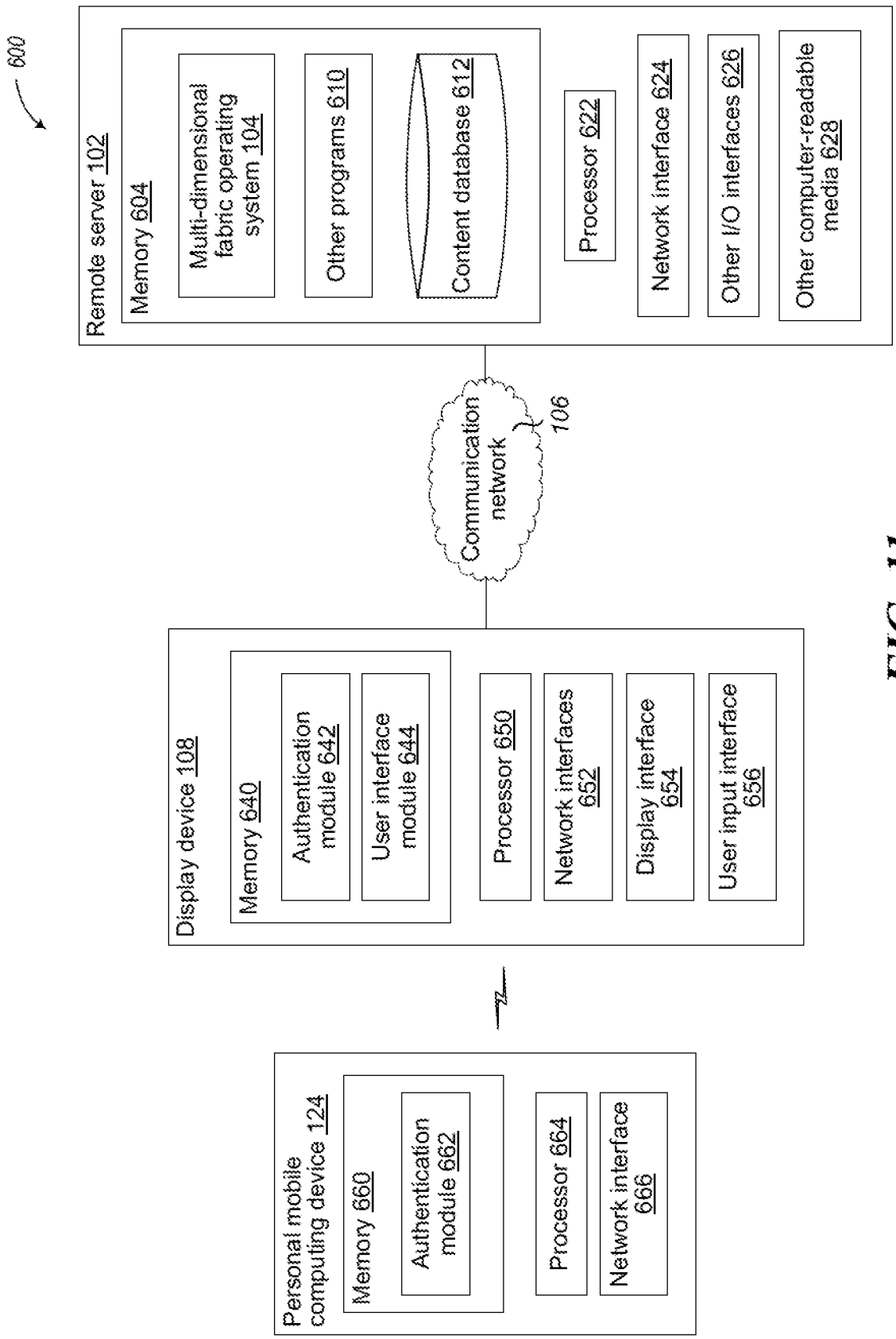
FIG. 11 illustrates a system diagram that describes one implementation of computing systems for implementing embodiments described herein.

FIG. 11 shows a system diagram that describes one implementation of computing systems for implementing embodiments described herein. System 600 includes remote server 102, one or more display devices 108, and one or more personal mobile computing devices 124.

As described herein, the remote server 102 is a computing device that can perform functionality described herein for implementing an operating system that provides a multi-dimensional fabric user interface for storing content. One or more special purpose computing systems may be used to implement the remote server 102. Accordingly, various embodiments described herein may be implemented in software, hardware, firmware, or in some combination thereof. The remote server 102 includes memory 604, one or more processors 622, network interface 624, other input/output (I/O) interfaces 626, and other computer-readable media 628. In some embodiments, the remote server 102 may be implemented by cloud computing resources.

Processor 622 includes one or more processing devices that execute computer instructions to perform actions, including at least some embodiments described herein. In various embodiments, the processor 622 may include one or more central processing units ("CPU"), programmable logic, or other processing circuitry.

Memory 604 may include one or more various types of non-volatile and/or volatile storage technologies. Examples of memory 604 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 604 may be utilized to store information, including computer-readable instructions that are utilized by processor 622 to perform actions, including at least some embodiments described herein.

Memory 604 may have stored thereon multi-dimensional fabric operating system 104. The multi-dimensional fabric operating system 104 authenticates users of personal mobile computing devices 124 via display devices 108 and provides a user interface of a multi-dimensional fabric for storing and accessing content, as described herein.

Memory 604 may include a content database 612 for storing content in accordance with the multi-dimensional fabric user interface. Memory 604 may also store other programs 610. The other programs 610 may include other operating systems, user applications, or other computer programs that are accessible to the personal mobile computing device 124 via the display device 108.

Network interface 624 is configured to communicate with other computing devices, such as the display devices 108, via a communication network 106. Network interface 624 includes transmitters and receivers (not illustrated) to send and receive data associated with the multi-dimensional fabric user interface described herein.

Other I/O interfaces 626 may include interfaces for various other input or output devices, such as audio interfaces, other video interfaces, USB interfaces, physical buttons, keyboards, haptic interfaces, tactile interfaces, or the like. Other computer-readable media 628 may include other types of stationary or removable computer-readable media, such as removable flash drives, external hard drives, or the like.

The display devices 108 are computing devices that are remote from the remote server 102. In some embodiments, the display devices 108 may include one or more computing devices and display devices. The display devices 108 coordinate authentication between the personal mobile computing devices 124 and the remote server 102. The display devices 108 receive input from the users of the personal mobile computing device 124 and provide the input to the remote server 102. The display devices 108 receive the graphical user interfaces for the multi-dimensional fabric user interface to be presented to the users of the personal mobile computing devices 124.

One or more special-purpose computing systems may be used to implement the display devices 108. Accordingly, various embodiments described herein may be implemented in software, hardware, firmware, or in some combination thereof.

The display devices 108 include memory 640, one or more processors 650, network interface 652, display interface 654, and user input interface 656. The memory 640, processor 650, and network interface 652 may be similar to, include similar components, or incorporate embodiments of memory 604, processor 622, and network interface 624 of remote server 102, respectively. Thus, processor 650 includes one or more processing devices that execute computer instructions to perform actions, including at least some embodiments described herein. In various embodiments, the processor 650 may include one or more CPUs, programmable logic, or other processing circuitry. The network interfaces 652 is also configured to communicate with the personal mobile computing devices 124, such as via Bluetooth or other short-range communication protocol or technology.

Memory 640 may include one or more various types of non-volatile and/or volatile storage technologies. Memory 640 may be utilized to store information, including computer-readable instructions that are utilized by processor 650 to perform actions, including at least some embodiments described herein. Memory 640 may store various modules or programs, including authentication module 642 and user interface module 644. The authentication module 642 may perform actions that coordinate the authentication between the personal mobile computing devices 124 and the remote server 102. The user interface module 644 receives graphical user interface data from the remote server 102 for display or presentation, via the display interface 654, to the user of the personal mobile computing devices 124. The user interface module 644 also receives user input via the user input interface 656 and provides that input back to the remote server 102. In various embodiments, one or more capacitive, radar, infrared, LIDAR, or other type of gesture capturing sensors may be used to receive the user input. In some other embodiments, the user interface module 644 may receive user inputs via other input mechanisms, such as a mouse, stylus, voice-recognition, or other input sensors. Memory 640 may also store other programs.

The personal mobile computing devices 124 are computing devices that are remote from the display devices 108 and the remote server 102. When a personal mobile computing device 124 is within a threshold range of the display device 108 or when a user of the personal mobile computing device 124 activates authentication, the personal mobile computing device 124 provides authentication data or information to the display device 108 for forwarding to the remote server 102. In various embodiments, the personal mobile computing device 124 is separate from the display device 108, such that a user can walk up to a display device 108 with the personal mobile computing device 124 to initiate the process described herein to have the display device 108 present the user interface of the multi-dimensional fabric received from the remote server 102. The user can then provide input to the display device 108, such as with hand gestures or arm movement, to manipulate the multi-dimensional fabric user interface and select content for display.

One or more special-purpose computing systems may be used to implement the personal mobile computing devices 124. Accordingly, various embodiments described herein may be implemented in software, hardware, firmware, or in some combination thereof.

The personal mobile computing devices 124 include memory 660, one or more processors 664, and a network interface 666. The memory 660, processor 664, and network interface 666 may be similar to, include similar components, or incorporate embodiments of memory 640, processor 650, and network interfaces 652 of display devices 108, respectively. Thus, processor 664 includes one or more processing devices that execute computer instructions to perform actions, including at least some embodiments described herein. In various embodiments, the processor 664 may include one or more CPUs, programmable logic, or other processing circuitry. The network interface 666 is configured to communicate with the display devices 108, but not with the remote server 102.

Memory 660 may include one or more various types of non-volatile and/or volatile storage technologies. Memory 660 may be utilized to store information, including computer-readable instructions that are utilized by processor 666 to perform actions, including at least some embodiments described herein. Memory 660 may store various modules or programs, including authentication module 662. The authentication module 662 may perform actions to communicate authentication information to a display device 108 when within a threshold distance from the display device or when activated by a user.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A system for dynamically grouping and displaying a plurality of content cards, the system comprising:
   a personal mobile computing device that stores authentication information, the personal mobile computing device including a device memory that stores device computer instructions and a device processor that when executing the device computer instructions causes the personal mobile computing device to:
      display a multi-dimensional fabric user interface to a user of the personal mobile computing device, wherein the multi-dimensional fabric user interface represents an actual physical location and is displayed to the user of the personal mobile computing device based on valid authentication of the personal mobile computing device with the user; and
      receive input from the user including a virtual location, date, and time at which the user requests to visit a virtual representation of the actual physical location; and
   the remote server includes a server memory that stores server computer instructions and a server processor that when executing the server computer instructions causes the remote server to:
      provide the multi-dimensional fabric user interface specific for the user to the personal mobile computing device based on the valid authentication of the personal mobile computing device, and the virtual location, date, and time at which the user requests to visit;
      enable the user to view the plurality of content cards;
      group the plurality of content cards viewed by the user into decks based on a first characteristic of content in the content card;
      enable scrolling navigation by the user through the decks of content cards, wherein the content cards are in an expanded form, wherein each deck is displayable on a display device, and wherein the decks of content cards are stacked in a collapsed form after they have been scrolled through, manipulated, or otherwise viewed, by the user;
      in response to a first input initiating a first selected deck in the decks of content cards to be displayed in the collapsed form, display the first selected deck of content cards in the collapsed form on the display device, wherein the first selected deck of content cards is expandable in response to an additional user input; and
      in response to a second input initiating a second selected deck in the decks of content cards to be displayed in the stack form, display the second selected deck of content cards in the stack form on the display device, wherein the second selected deck of content cards is expandable in response to an additional user input.

2. The system of claim 1, wherein the server processor executes further server computer instructions that further cause the remote server to:
   further divide groups into sub-groups based on an action or input provided by the user.

3. The system of claim 1, wherein the action or input provided by the user that causes the content cards in the groups to be further divided into sub-groups is the user utilizing a swiping left gesture on a content card that is displayed on the personal mobile computing device, the user utilizing a swiping right gesture on a content card that is displayed on the personal mobile computing device, or both.

4. The system of claim 1, wherein the server processor executes further server computer instructions that further cause the remote server to:
   sub-group the plurality of decks of content cards based on additional characteristic of the contents in the decks of content cards.

5. The system of claim 1, wherein the content cards are organized based on a second characteristic of the contents along a first axis of a grid.

6. The system of claim 5, wherein the content cards are organized based on a third characteristic of the contents along a second axis of a grid.

7. The system of claim 1, wherein the server processor executes further server computer instructions that further cause the remote server to:
   in response to new content cards being added to the plurality of content cards, display the new content cards as a standalone content cards in relation to the plurality of content cards; and
   in response to a third input instructing the new content cards to be added to a target deck of content cards, add the new content cards to the target deck of content cards.

8. The system of claim 1, wherein the manipulation of the multi-dimensional fabric user interface based on the received input from the user includes anchoring digital content to the multi-dimensional fabric user interface.

9. The system of claim 1, wherein the manipulation of the multi-dimensional fabric user interface based on the received input from the user includes anchoring digital content to a user in the multi-dimensional fabric user interface.

10. The system of claim 1, wherein the server processor executes further server computer instructions that further cause the remote server to:
    when a deck of content cards is displayed in the expanded form, enable a user to scroll through content cards in the deck.

11. The system of claim 1, wherein the server processor executes further server computer instructions that further cause the remote server to:
    when the plurality of decks of content cards are all displayed in the stacked form, enable a user to scroll through the plurality of decks of content cards.

12. A computer device for dynamically grouping and displaying a plurality of content cards, the computer device comprising:
    a processor; and
    a memory that stores computer instructions, the processor when executing the computer instructions causing the computer device to:
      provide a multi-dimensional fabric user interface specific for a user to the personal mobile computing device based on a valid authentication of the user, and a virtual location, date, and time at which the user requests to visit;
      group the plurality of content cards viewed by the user into decks based on a first characteristic of content in the content card;
      enable scrolling navigation by the user through the decks of content cards, wherein the content cards are in an expanded form, wherein each deck is displayable on a display device, and wherein the decks of content cards are stacked in a collapsed form after they have been scrolled through, manipulated, or otherwise viewed, by the user;
      in response to a first input initiating a first selected deck in the decks of content cards to be displayed in the collapsed form, display the first selected deck of content cards in the collapsed form on the display device, wherein the first selected deck of content cards is expandable in response to an additional user input; and
      in response to a second input initiating a second selected deck in the decks of content cards to be displayed in the stack form, display the second selected deck of content cards in the stack form on the display device, wherein the second selected deck of content cards is expandable in response to an additional user input.

13. The system of claim 12, wherein the processor executes further computer instructions that further cause the computer device to:
    sub-group the plurality of decks of content cards based on additional characteristic of the contents in the decks of content cards.

14. The system of claim 12, wherein the content cards are organized based on a second characteristic of the contents along a first axis of a grid.

15. The system of claim 14, wherein the content cards are organized based on a third characteristic of the contents along a second axis of a grid.

16. The system of claim 12, wherein the processor executes further computer instructions that further cause the computer device to:
    in response to new content cards being added to the plurality of content cards, display the new content cards as a standalone content cards in relation to the plurality of decks of content cards; and
    in response to a third input instructing the new content cards to be added to a target deck of content cards, add the new content cards to the target deck of content cards.

17. The system of claim 12, wherein the manipulation of the multi-dimensional fabric user interface based on a received input from the user includes anchoring digital content to the multi-dimensional fabric user interface.

18. The system of claim 12, wherein the manipulation of the multi-dimensional fabric user interface based on a received input from the user includes anchoring digital content to a user in the multi-dimensional fabric user interface.

19. The system of claim 12, wherein the processor executes further computer instructions that further cause the computer device to:
    when a deck of content cards is displayed in the expanded form, enable a user to scroll through content cards in the deck.

20. The system of claim 12, wherein the processor executes further computer instructions that further cause the computer device to:

when the plurality of decks of content cards are all displayed in the stacked form, enable a user to scroll through the plurality of decks of content cards.

21. A method for dynamically grouping and displaying a plurality of contents, the method comprising:

selecting a multi-dimensional fabric user interface specific for a user based on a valid authentication of a personal mobile computing device, and a virtual location, date, and time at which the user requests to visit;

enabling the user to view a plurality of content cards;

grouping the plurality of content cards viewed by the user into decks based on a first characteristic of content in the content card;

enabling scrolling navigation by the user through the decks of content cards, wherein the content cards are in an expanded form, wherein each deck is displayable on a display device, and wherein the decks of content cards are stacked in a collapsed form after they have been scrolled through, manipulated, or otherwise viewed, by the user;

in response to a first input initiating a first selected deck in the decks of content cards to be displayed in the collapsed form, displaying the first selected deck of content cards in the collapsed form on the display device, wherein the first selected deck of content cards is expandable in response to an additional user input; and in response to a second input initiating a second selected deck in the decks of content cards to be displayed in the stack form, displaying the second selected deck of content cards in the stack form on the display device, wherein the second selected deck of content cards is expandable in response to an additional user input.

\* \* \* \* \*